United States Patent

Piedallu

[15] 3,688,684
[45] Sept. 5, 1972

[54] OSCILLATING DEEP FRYER

[72] Inventor: Marcel M. Piedallu, 2221 Mary Jane Lane, Park Ridge, Ill. 60068

[22] Filed: May 24, 1971

[21] Appl. No.: 146,046

[52] U.S. Cl. ..........................99/409, 74/44, 99/348, 259/91, 308/3 R
[51] Int. Cl. ..............................................A47j 37/12
[58] Field of Search.........99/409, 348; 308/2 R, 2 A, 308/3 R; 74/44; 259/DIG. 35, DIG. 42, DIG. 3, DIG. 21, DIG. 20, 75, 91; 165/109

[56] References Cited

UNITED STATES PATENTS 3,218,959   11/1965   Swisher ......................99/409
2,569,707   10/1951   Cardell..........................74/44

Primary Examiner—Leon G. Machlin
Attorney—Hill, Sherman, Meroni, Gross & Simpson

[57] ABSTRACT

An oscillating deep fryer for cooking items such as souffle potatoes which has a deep frying container which is oscillated back and forth and also slightly up and down so as to properly cook items in the fryer. An adjusting mechanism is engageable with a linkage between the driving motor and the frying container to allow the motion of the container to be controlled. Spring-loaded plungers engage the linkage and the tension and position of the linkage may be adjusted to vary the throw and response.

6 Claims, 2 Drawing Figures

PATENTED SEP 5 1972   3,688,684

INVENTOR.
MARCEL M. PIEDALLU

BY ATTORNEYS

OSCILLATING DEEP FRYER

CROSS-REFERENCES TO RELATED APPLICATIONS

This invention comprises an improvement on my invention titled "Oscillating Deep Fryer," filed Dec. 17, 1969, Ser. No. 885,665 now U.S. Pat. No. 3,635,150, issued Jan. 18, 1972.

BACKGROUND OF THE INVENTION

1. Field of the Invention

This invention relates in general to cooking utensils and in particular to an oscillating deep fryer for cooking potatoes or other items.

2. Description of the Prior Art

Generally it has been necessary for cooks to continually stir items as they are fried to prevent them from burning. Souffle potatoes have previously been prepared in a shallow casserole or frying pan and must be continually stirred to prevent the potatoes from burning and to cook them uniformly. This makes it difficult and expensive to prepare large quantities of such items.

SUMMARY OF THE INVENTION

The present invention comprises an improved oscillating deep fryer which has a container which is driven by an eccentric and a motor so as to continually oscillate and vibrate the cooking container. The linkage is connected between the driving motor and the cooking pan and the present invention provides an adjustable spring-loaded control for the linkage such that the throw and form of vibration may be adjusted as desired.

Other objects, features and advantages of the invention will be readily apparent from the following description of a preferred embodiment thereof taken in conjunction with the accompanying drawings, variations and modifications may be effected without departing from the spirit and scope of the novel concepts of this disclosure, and in which:

DESCRIPTION OF THE PREFERRED EMBODIMENT

Figure 1:
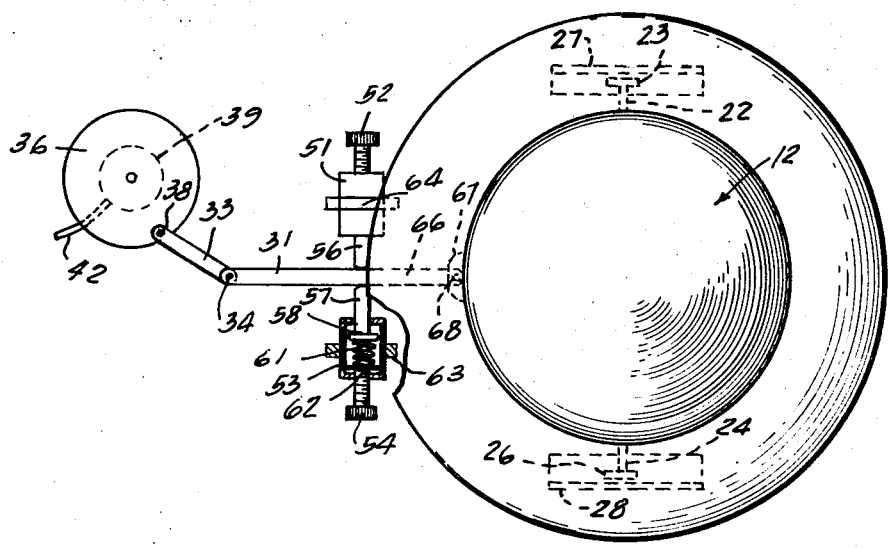
FIG. 1 is a top plan view of the oscillating deep fryer of this invention.
Figure 2:
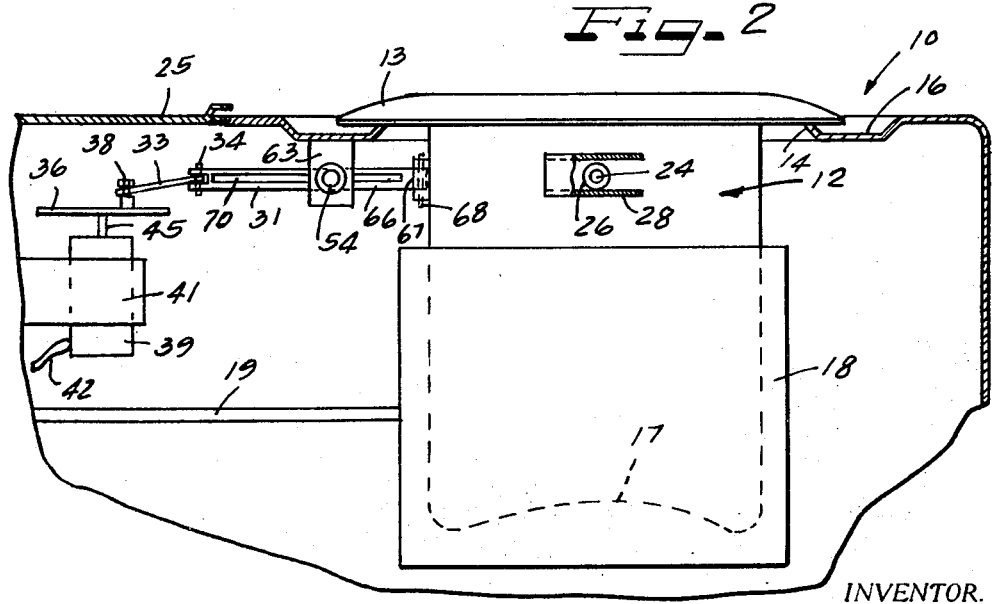
FIG. 2 is a side elevational detail view showing the driving and linkage mechanism of the oscillating deep fryer.

The oscillating deep fryer of the invention is illustrated in FIGS. 1 and 2 wherein a cabinet designated generally as 10 supports an oscillating deep frying container 12. The container 12 has a bottom 17 which is convex such that it extends upwardly into the container as shown in FIG. 2 and a heating element 18 is attached to the container and includes suitable heating elements to which power is applied by a power cable 19. The cable 19 is flexible so that the fryer may move relative to the cabinet 10. The container 12 is supported on shafts 22 and 24 attached adjacent the top to either side thereof and rollers 23 and 26 are mounted on the shafts 22 and 24, respectively, and travel in guides 27 and 28 which are connected to the cabinet 10. The container 12 has an upwardly extending lip 13 that overlaps the edges of the opening 14 formed in the top 25 of the cabinet 10. A depression 16 is formed in the top of the cabinet so as to catch any oil or grease that might be removed from the container 12.

It is seen that the container 12 may move backward and forwardly on the rollers 23 and 26 in the tracks 27 and 28 and also pivot on the shafts 22 and 24 so as to provide a transverse as well as a pivoting motion about the shafts 22 and 24.

A driving means as, for example, the motor 39 is connected to a power supply by power cable 42 and is supported from the cabinet 10 by a bracket 41. The driving shaft 45 of the motor 39 carries a disc 36 and a linkage 33 is pivotally connected by pin 38 to the disk 36. The link 31 has one end pivotally connected by a pin 34 to the link 33 and has its other end 66 connected to the container 12 with a bracket 67 and a pivot pin 68.

A linkage adjusting mechanism comprises a pair of pistons 56 and 57 which are engageable with the sides of the link 31 as shown in FIGS. 1 and 2. The pistons 56 and 57 are respectively received in cylinders 51 and 53 which are connected respectively by brackets 64 and 63 to the top of the cabinet. The position and spring tension on the pistons 56 and 57 is adjustable by shafts and knobs 52 and 54 which are threadedly received in the cylinders 51 and 53. Cylinder 53 is shown in section and it is seen that the inner end of the piston 57 carries an enlarged shoulder 58 against which spring 61 bears. The threaded screw 54 has an enlarged shoulder 62 within the cylinder 53 and the tension on the spring 61 may be adjusted by rotating the threaded knob 54 in mating threads in the cylinder 53.

As best shown in FIG. 2, the disk 36 is offset vertically from the pivot point of the linkage 31 with the container 12 so that a slight up and down motion will be imparted to the container 12. Also as best shown in FIG. 1, the motor is offset laterally from a line determined by the pivot pin 68 and the center of the container 12.

The motor 39 may be a DC motor whose speed may be adjustable by a mechanism not shown and might operate in the range from 60 to 100 rpm for example. The throw of the linkage 31 might be within the range of 2 to 5 inches which is adjustable by moving the pistons 56 and 57 relative to the cylinders 51 and 53 by turning the knobs 52 and 54.

In operation, suitable oil or shortening is placed in the container 12 and the temperature is controlled by the heater 18. The motor 39 is started by applying power and the threaded shafts 52 and 54 are manually adjusted through suitable openings provided in the cabinet 10 for this purpose to adjust the throw and motion of the container 12. As the motor 39 rotates the disk 36 and the linkages 33 and 31 cause the container to move back and forth in the tracks 27 and 28 on the rollers 23 and 26 and due to the lateral offset of the disk 36 with the shafts 22 and 24 the container 12 will have a slight up and down motion as it oscillates in the tracks 27 and 28. By adjusting the threaded shafts 52 and 54, the pistons 56 and 57 move the link 31 to different positions allowing the throw and type of motion of the container 12 to be adjusted. The linkage 31 slides against the ends of the pistons 56 and 57 and as the angle of the linkage 31 is varied relative to the pivot point 68 different amounts of throw may be obtained on the container 12.

The spring 61 and the associated spring in the piston 51 allow some give to the pistons 56 and 57.

It is seen that this invention provides means for easily and simply cooking large quantities of materials and although it has been described with respect to a preferred embodiment, it is not to be so limited as changes and modifications may be made therein which are within the full intended scope as defined by the appended claims.

A curved groove 70 may be formed in the side wall of member 31 in which the end of the plunger 57 rides.

I claim as my invention:

1. An oscillating fryer comprising a frame member, a cooking container supported for oscillatory movement by said frame member, a driving means mounted on said frame member, crank arm means attached to said driving means, a first link with one end pivotally attached to said container, a second link with one end pivotally connected to said crank arm means and with the other end pivotally connected to the other end of said first link, and means for guiding said first link and comprising means for spring biasing said first link in a direction which lies in the plane of movement of said crank arm means.

2. An oscillating fryer according to claim 1 wherein said means for biasing said first link comprises a plunger which engages said first link on one side thereof, a guide means attached to said frame member and guiding said plunger, and a spring mounted between said plunger and said frame to bias it toward said first link.

3. An oscillating fryer according to claim 2 wherein said means for biasing said first link includes a second plunger which engages said first link on a second side thereof, a second guide means attached to said frame member and guiding said second plunger, and a second spring mounted between said frame member and said second plunger to bias it toward said first link.

4. An oscillating fryer according to claim 2 comprising means for adjusting the spring bias on said plunger.

5. An oscillating fryer according to claim 4 wherein said adjusting means comprises a lead screw threaded into said guide means and engageable with said spring.

6. An oscillating fryer according to claim 3 comprising means for adjusting the spring bias on said first and second plungers.

* * * * *